US008822580B2

(12) United States Patent
Korenkiewicz et al.

(10) Patent No.: US 8,822,580 B2
(45) Date of Patent: Sep. 2, 2014

(54) ARCHITECTURAL PAINT AND STAIN TINTING SYSTEM WITH TIP DRYING RESISTANCE (75) Inventors: Stephen M. Korenkiewicz, Prospect, KY (US); Willard Reid Cornell, Jr., Mount Washington, KY (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/519,853

(22) PCT Filed: Jan. 11, 2010

(86) PCT No.: PCT/US2010/020651
§ 371 (c)(1),
(2), (4) Date: Jun. 28, 2012

(87) PCT Pub. No.: WO2011/084162
PCT Pub. Date: Jul. 14, 2011

(65) Prior Publication Data
US 2012/0316273 A1    Dec. 13, 2012

(51) Int. Cl.
| B67D 7/06 | (2010.01) |
| B67D 7/02 | (2010.01) |
| C08K 5/06 | (2006.01) |
| C08K 3/22 | (2006.01) |
| C08K 3/26 | (2006.01) |
| C08K 3/36 | (2006.01) |
| C08K 3/30 | (2006.01) |
| C09D 7/12 | (2006.01) |
| C09C 1/42 | (2006.01) |
| C09C 1/30 | (2006.01) |
| C09D 5/02 | (2006.01) |
| C09C 1/02 | (2006.01) |
| C09C 1/00 | (2006.01) |
| C09D 7/00 | (2006.01) |
| C09D 7/14 | (2006.01) |
| C09D 17/00 | (2006.01) |
| C09C 1/40 | (2006.01) |
| C09D 171/02 | (2006.01) |

(52) U.S. Cl.
CPC ............... *C09C 1/00* (2013.01); *C01P 2006/60* (2013.01); *C09D 7/1233* (2013.01); *C09C 1/42* (2013.01); *C09C 1/30* (2013.01); *C09D 5/027* (2013.01); *C09C 1/028* (2013.01); *C09C 1/02* (2013.01); *C09D 7/002* (2013.01); *C09D 7/14* (2013.01); *C09C 1/021* (2013.01); *C09D 17/00* (2013.01); *C09C 1/407* (2013.01); *C09C 1/402* (2013.01); *C09D 5/028* (2013.01); *C09C 1/027* (2013.01)
USPC ........... 524/366; 524/425; 524/437; 524/436; 524/339; 222/129

(58) Field of Classification Search
None
See application file for complete search history.

(56) References Cited

U.S. PATENT DOCUMENTS

| 5,340,394 | A * | 8/1994 | Elsamanoudi | 106/500 |
| 5,814,144 | A * | 9/1998 | Coutts et al. | 106/499 |
| 5,897,698 | A | 4/1999 | Bellas | |
| 6,287,377 | B1 * | 9/2001 | Binns et al. | 106/499 |
| 6,488,760 | B1 | 12/2002 | Binns et al. | |
| 6,701,977 | B2 * | 3/2004 | Taylor et al. | 141/83 |
| 8,119,717 | B2 | 2/2012 | Anchor et al. | |
| 2006/0207476 | A1 | 9/2006 | Coward et al. | |
| 2008/0092776 | A1 | 4/2008 | Stockl et al. | |
| 2008/0148995 | A1 | 6/2008 | Lawlor et al. | |
| 2009/0310856 | A1 | 12/2009 | Korenkiewicz et al. | |
| 2012/0095128 | A1 | 4/2012 | Chakrabarti et al. | |

FOREIGN PATENT DOCUMENTS

GB            861223  A  *  2/1961

OTHER PUBLICATIONS

Properties of Hexaethylene glycol monononyl ether. Chemical Abstracts Service. 2013.*
Properties of Nonaethylene glycol. Chemical Abstracts Service. 2013.*

Powder Color Properties. Akrochem Corporation. http://www.akrochem.com/powder_color_properties.php. As viewed on Oct. 8, 2013.*

ASTM International Designation D 4946-89 (Reapproved 2003), Standard Test Method for Blocking Resistance of Architectural Paints, 2 pages.

* cited by examiner

*Primary Examiner* — Robert C Boyle
*Assistant Examiner* — Stephen Rieth
(74) *Attorney, Agent, or Firm* — IPLM Group, P.A.

(57) ABSTRACT

Custom-tinted paints and stains are made using an array of low VOC concentrated liquid colorants including at least at least white colorant; black colorant; and green-hued, blue-hued and red-hued primary colorants at least one of which primary colorants comprises polyalkylene glycol humectant, ethoxylated surfactant and extender pigment. For colorants in the array containing polyalkylene glycol humectant, the humectant and ethoxylated surfactant amounts are sufficiently high and extender pigment amount is sufficiently low so that the colorants will not problematically plug colorant dispenser orifices if left in the dispenser without an orifice cap for a full day. The polyalkylene glycol humectant is also present in an amount sufficiently low so that dried paint films made by mixing the colorants with a clear waterborne base paint will resist blocking.

25 Claims, 3 Drawing Sheets

Fig. 3

ARCHITECTURAL PAINT AND STAIN TINTING SYSTEM WITH TIP DRYING RESISTANCE

CROSS REFERENCE TO RELATED APPLICATIONS

This application is national stage filing under 35 U.S.C. §371 of International Application No. PCT/US2010/020651 filed 11 Jan. 2010.

FIELD

This invention relates to point-of-sale customized-color architectural paint and stain tinting systems, such as those used in retail paint stores to make custom-tinted architectural paints or stains.

BACKGROUND

Architectural paint and stain manufacturers typically distribute premixed paints and stains in a small number of popular colors. To accommodate consumer desires and to enable matching of existing painted or stained surfaces, architectural paint and stain manufacturers typically also distribute a set of tintable base paints or stains and several concentrated colorants. These are combined at point-of-sale outlets using colorant dispensing and shaker mixing equipment to make small batch lots of custom-tinted paints or stains in a much larger array of colors than the limited colors available in premixed products.

A typical custom color paint system may employ several tintable base paints ranging for example from a nearly filled container of bright white base intended to accept at most a small quantity of colorant, to a less-filled container of unpigmented transparent or clear base intended to accept a much larger quantity of colorant. Base paints or stains may employ various binders (e.g., natural or synthetic resins), binder forms (e.g., solution polymers or latex polymers) and vehicles (e.g., solvent-base or waterborne versions), and may provide various dried surface finishes (e.g., matte, semi-gloss or gloss finishes). Some manufacturers also sell colored base paints (e.g. red, blue and yellow colored bases) which are intended to be combined with additional colorants when one coat hiding power is desired for strongly-tinted custom paint shades.

Colorants may for example be volumetrically metered from a multiple-colorant dispensing stations, with 12 paint colorants typically being employed in paint tinting colorant dispensing stations for the U.S. market, and more (e.g., 16 or 24 colorants) sometimes being employed in other markets. The dispensing station may for example include an individual dispensing canister for each colorant, and each dispensing canister may for example include a manually- or automatically-movable piston which forces a metered amount of colorant through a nozzle or other dispensing orifice and into a container of base paint or stain.

Owing to environmental and other concerns, modern-day paints and stains desirably are formulated as low volatile organic compound (low VOC) products. The same is true for the colorants used to tint low VOC base paints and stains. Unfortunately, many low VOC colorants tend to dry out in the dispensing station. Such drying may partially or completely plug the associated dispensing station orifices, may cause colorant to leak from or rupture connections inside the dispensing station, or may cause colorant to spray from the dispensing station orifices at a sufficiently oblique angle so that the colorant misses the base paint or stain container. Other consequences of such plugging may include inaccurate colorant dispensing and tinting, or a periodic need to disassemble and clean the dispensing station. Some colorant manufacturers have attempted to address these problems by adding higher than normal humectants levels to colorant formulations. However, doing so may cause or aggravate blocking, especially in tints prepared by adding large amounts of colorant to clear bases. Some colorant or dispensing station manufacturers have attempted to address tip plugging by providing removable caps for the dispensing station orifices. Unfortunately, users must remember to install the caps when the dispensing station will be left idle for a sufficiently long time that plugging may occur (e.g., when a paint store closes for the day) and remove the caps when use of the dispensing station resumes (e.g., when the paint store reopens the following day). Some point-of-sale outlets have instead purchased or converted to dispensing stations equipped with a cap that automatically moves away from the dispensing orifices when the dispensing station is in use. Doing so may however be expensive, and many uncapped or manually capped dispensing stations are still being used.

SUMMARY OF THE INVENTION

Some colorants are less prone to drying and dispensing station plugging than other colorants. For example, some low-VOC white, black, yellow oxide or red oxide colorants tend not to cause orifice plugging. Other low-VOC colorants, and especially strongly-pigmented red, blue or green primary additive colorants and some strongly-pigmented yellow colorants, are more prone to cause orifice plugging. If even one or two of the colorants in an array of colorants causes orifice plugging, then a cap or other measure generally will be needed to prevent tip plugging when a colorant dispenser containing such colorants is to be left idle for an extended time period.

Some colorants contain polyalkylene glycol humectants, which provide reduced VOC levels compared to colorants employing other humectants such as ethylene glycol or propylene glycol. Many colorants also contain extender pigments (e.g., talc), which may provide a number of benefits such as improved rheological properties, improved dried surface appearance (e.g., increased gloss), improved hiding, improved moisture or weather resistance or reduced cost. Experiments conducted by the present inventors have shown that colorants with a reduced tendency to cause orifice plugging, and a reduced tendency to cause blocking in highly tinted clear base paints prepared from such colorants, may be prepared by employing an appropriately-selected blend of polyalkylene glycol humectant, ethoxylated surfactant and extender pigment in at least the most plugging-prone colorants in a colorant array. By employing an ethoxylated surfactant together with the polyalkylene glycol, adequate colorant drying performance and plugging resistance may be obtained at reduced and consequently less blocking-prone polyalkylene glycol levels. If a plug does form, it may be softer and more easily extruded from the dispensing station orifice than a dried, non-extrudable and consequently problematic plug formed from a conventional colorant. In addition, by reducing the extender pigment amount in one or more hued colorants (viz., colorants other than white or black) below the amount which might otherwise be employed, colorant drying performance may be further improved and the required polyalkylene glycol amount may be further reduced.

Some previously-reported colorants have contained a polyalkylene glycol humectant, an ethoxylated surfactant and an extender pigment. However, these colorants have been part of colorant arrays containing one or more plugging-prone colorants, and the relationships among these three ingredients, and especially the relationship between the humectant and the extender pigment, appear not to have been properly understood. When those relationships are appreciated and the amounts of the three ingredients are appropriately selected, a colorant manufacturer can produce colorant arrays whose colorants are all adequately plug-resistant when left undisturbed for a full day in a colorant dispensing machine while still providing adequate blocking resistance in dried highly tinted paints prepared from clear bases.

The present invention provides, in one aspect, a point-of-sale system for making custom-tinted waterborne architectural paints and stains, the system comprising an array of low VOC concentrated liquid colorants comprising pigment or dye and a vehicle, the array including at least white colorant; black colorant; and green-hued, blue-hued and red-hued primary colorants at least one of which primary colorants comprises polyalkylene glycol humectant, ethoxylated surfactant and extender pigment; wherein for colorants in the array containing polyalkylene glycol humectant the amounts of such polyalkylene glycol humectant and any ethoxylated surfactant are sufficiently high and the amount of any extender pigment is sufficiently low so that sprinkled sand will adhere to 0.08 mm (3 mil) wet coating thickness films of each of the colorants in the array after air drying such films for at least 24 hours in a conditioned room as described in ASTM D 4946-89 (Reapproved 2003), and wherein the amounts of polyalkylene glycol humectant in such polyalkylene glycol humectant-containing colorants are sufficiently low so that individual dried paint films made by mixing 9 vol. % of such polyalkylene glycol humectant-containing colorants with a clear waterborne base paint containing a binder having a Tg between about 10 and 20° C. will exhibit a blocking resistance rating of 4 or more when evaluated using ASTM D 4946-89 (Reapproved 2003).

The invention provides, in yet another aspect, a point-of-sale method for making custom-tinted architectural paints or stains, the method comprising:

a) dispensing colorant into waterborne base paint or stain from a colorant dispenser having a plurality of colorant dispensing orifices each of which is in fluid communication with a colorant of an array of low VOC concentrated liquid colorants comprising pigment or dye and a vehicle, the array including at least white colorant; black colorant; and green-hued, blue-hued and red-hued primary colorants at least one of which primary colorants comprises polyalkylene glycol humectant, ethoxylated surfactant and extender pigment; wherein for colorants in the array containing polyalkylene glycol humectant the amounts of such polyalkylene glycol humectant and any ethoxylated surfactant are sufficiently high and the amount of any extender pigment is sufficiently low so that sprinkled sand will adhere to 0.08 mm (3 mil) wet coating thickness films of each of the colorants in the array after air drying such films for at least 24 hours in a conditioned room as described in ASTM D 4946-89 (Reapproved 2003), and wherein the amounts of polyalkylene glycol humectant in such polyalkylene glycol humectant-containing colorants are sufficiently low so that individual dried paint films made by mixing 9 vol. % of such polyalkylene glycol humectant-containing colorants with a clear waterborne base paint containing a binder having a Tg between about 10 and 20° C. will exhibit a blocking resistance rating of 4 or more when evaluated using ASTM D 4946-89 (Reapproved 2003);

b) allowing the dispenser to remain idle with its orifices exposed to air for at least 24 hours and without forming problematic plugs; and c) dispensing colorant into additional base paint or stain from the colorant dispenser.

The disclosed systems and methods can have low VOC levels, while facilitating point-of-sale custom paint and stain tinting without requiring the use of orifice caps on the colorant dispensing orifices to prevent tip drying during 24 hour periods (e.g., Sunday store closings, national holidays or inventory days) during which the dispenser may be idle, and while enabling preparation of highly tinted clear base paints with desirable resistance to blocking.

BRIEF DESCRIPTION OF THE DRAWING

Like reference symbols in the various figures of the drawing indicate like elements. The elements in the drawing are not to scale.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a colorant composition that contains "a" pigment means that the coating composition may include "one or more" pigments.

The terms "architectural paints" and "architectural stains" respectively mean paints and stains for use on interior or exterior walls, trim, floors, ceilings or furniture.

The term "binder" means a film-forming natural or synthetic polymer or polymer precursor (e.g., a polymerizable monomer or oligomer) suitable for use in a paint or stain.

The teen "concentrated liquid colorant" means a composition that may be added to a point-of-sale container whose interior volume is largely (e.g., two thirds of the container volume or more) but not completely filled with a base paint or stain so as to alter the hue or lightness of such base paint or stain, and which contains pigment (or dye) and an optional vehicle or other carrier but is substantially free of binder.

The term "custom-tinted" when used with respect to a system or method for tinting architectural paints or stains means that one or more colorants can be dispensed into a base paint or stain and mixed to provide finished paint or stains in a wide variety (e.g., more than one hundred or even more than one thousand) of preselected formulated colors or, if desired, a match for randomly-selected colors. The preselected formulated colors will ordinarily be viewed by potential end users using printed color charts or displayed computer images.

The term "film-former" when used with respect to a polymer or polymer precursor means that the polymer or polymer precursor when applied to a non-porous substrate, if need be in a suitable vehicle or other carrier and if need be with a suitable catalyst, initiator, sensitizer, crosslinker or other polymerization promoter, is capable of forming or being converted to a continuous, substantially water-insoluble, polymeric film The term "hued" when used in respect to a colorant composition refers to hues in the Munsell color system and to colorants other than white and black.

The term "humectant" means a hygroscopic substance, preferably not a surfactant, that retards drying of a waterborne liquid coating composition.

The term "low VOC" when used with respect to a colorant, paint or stain composition means that the colorant, paint or stain when in liquid form contains less than about 10 wt. % volatile organic compounds, more preferably less than about 5 wt. % volatile organic compounds, and most preferably less than about 2 wt. % volatile organic compounds based upon the total liquid composition weight.

The term "paint" means a coating composition including pigment (or dye) and binder which when applied to form a thin (e.g., 100 μm) wet thickness coating film on a freshly-sanded smooth wood surface, will when dried hide both the wood grain and its texture and will present a new surface with its own appearance.

The term "pigment volume concentration" when used in respect to a colorant, paint or stain means the total percentage of dried coating volume occupied by all pigment or dye species in the coating.

The term "point-of-sale" means a site at which custom-mixed architectural paints or stains are tinted and mixed in small batch lots (e.g., one half pint, one pint, one quart, one liter, one gallon, four liter, five gallon or 20 liter containers, corresponding to containers from about 0.2 to 20 L) for sale to end-users (e.g., painters, builders and homeowners). Representative point-of-sale outlets include retail paint stores, hardware stores, building supply stores (including warehouses), and distribution centers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "primary" when used with respect to colorants in an array of colorants refers to the three colorants in the array that are respectively best suited via combination with a clear base to the making of green-, blue- or red-tinted paints corresponding generally to Munsell Color System hues 5G, 5B and 5R.

The term "solvent-borne" when used in respect to a colorant, paint or stain means that the major liquid vehicle or other carrier for the colorant, paint or stain is a nonaqueous solvent or mixture of nonaqueous solvents.

The term "stain" means a coating composition including binder which when applied to form a thin (e.g., 100 μm) wet thickness coating film on a freshly-sanded smooth wood surface, will when dried not hide both the wood grain and its texture. When a semi-transparent stain is applied to wood, the wood grain and its texture normally both remain noticeable, whereas when a solid color (viz., opaque) stain is applied the grain normally becomes hidden while the texture normally remains noticeable. A stain typically will soak into a wood or other porous substrate (e.g., concrete) to a much greater extent than will a paint.

When used with respect to a component which may be found in a colorant, paint or stain composition, the term "substantially free of" means containing less than about 5 wt. % and more preferably less than about 1 wt. % of the component based on the composition weight.

The term "surfactant" means a substance containing both hydrophilic and oleophilic groups and which is sufficiently soluble in at organic solvents and water so as to reduce interfacial tension between a phase containing the organic solvent and an aqueous phase.

The term "universal" when used in respect to a liquid colorant composition means that the colorant may be used to tint both waterborne and solvent-borne paints or stains.

The term "waterborne" when used in respect to a colorant, paint or stain means that the major liquid vehicle or other carrier for the colorant, paint or stain is water.

The recitation of a numerical range using endpoints includes all numbers subsumed within that range (e.g., 1 to 5 includes 1, 1.5, 2, 2.75, 3, 3.80, 4, 5, etc.).

Figure 1:
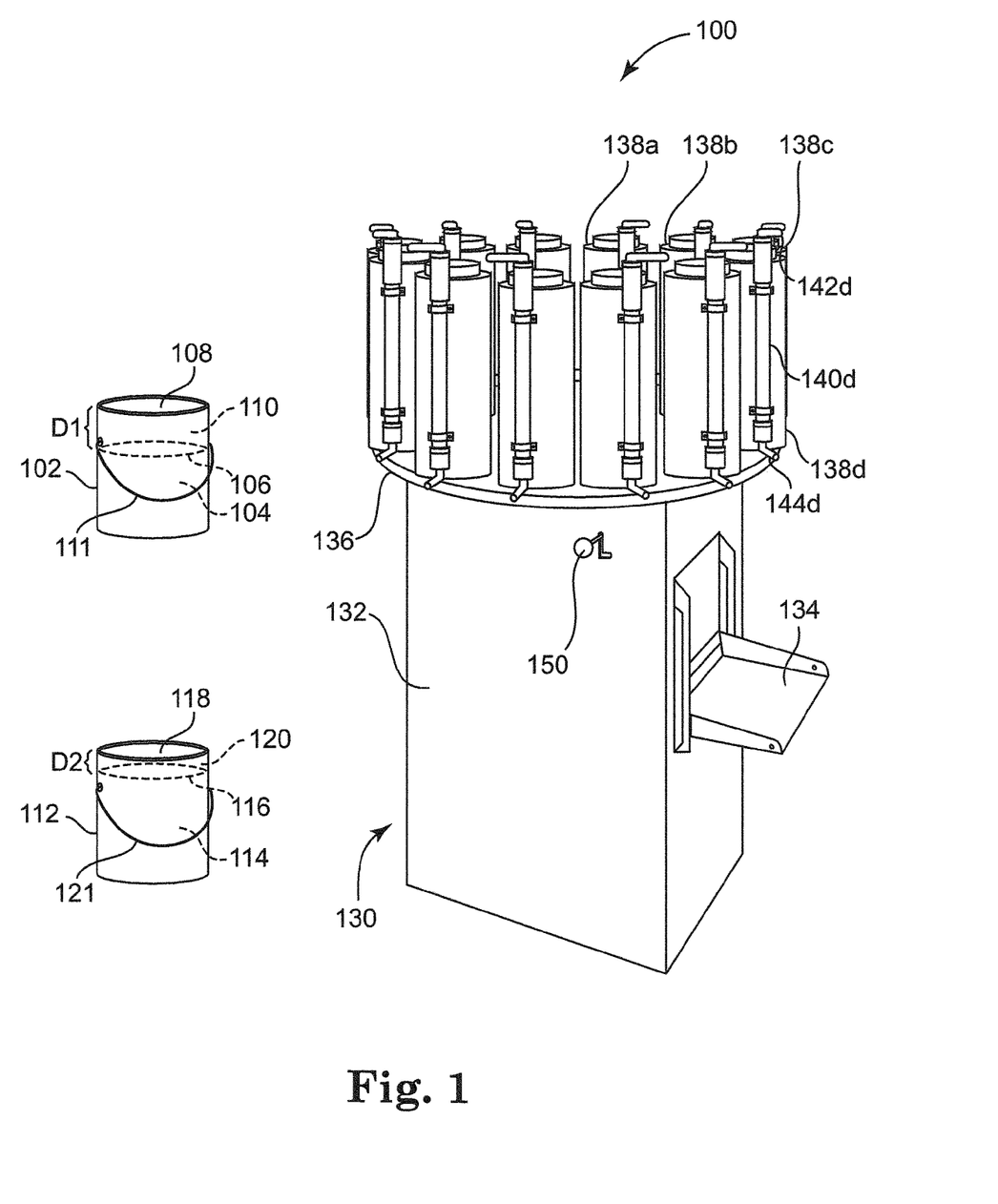
FIG. 1 and FIG. 2 are perspective views of embodiments of the disclosed paint or stain tinting system.

FIG. 1 shows a perspective view of an embodiment 100 of the disclosed paint and stain custom tinting system. Base paint or stain container 102 holds clear base paint or stain 104. The upper surface 106 (shown in phantom view) of base paint or stain 104 is located a sufficient distance D1 below container lid 108 so that an ample headspace 110 is available for the addition of one or more colorants to prepare a paint or stain with a custom-tint. Handle 111 may be used to carry container 102. Pigmented (e.g., white) base paint or stain container 112 holds liquid base paint or stain 114 containing at least one pigment (e.g., titanium dioxide, not shown in FIG. 1). The upper surface 116 (also shown in phantom view) of base paint or stain 114 is located a sufficient distance D2 below container lid 118 so that a headspace 120 is available for the addition of one or more colorants to prepare a paint or stain with a custom tint. Distance D2 typically will be less than distance D1 owing to the lower colorant amounts which might be required to convert base paint or stain 114 to a satisfactory tint. Handle 121 may be used to carry container 112. Base paint or stain containers 102 or 112 may be filled with concentrated colorant using manual colorant dispenser 130. Dispenser 130 includes cabinet 132 on which is mounted shelf 134 where containers 102 or 112 may be placed for colorant addition. Turntable 136 includes a series of refillable colorant dispenser canisters (twelve in this case, four of which are numbered as 138a, 138b, 138c and 138d) containing a point-of-sale array of liquid colorants which when dispensed into a base paint or stain will provide custom-tinted architectural paints or stains in a variety of custom tints. Canister 138d includes a metered dispensing cylinder 140d containing a piston and connecting link (neither of which is shown in FIG. 1) joined to movable handle 142d whose position can be adjusted vertically along cylinder 140d to provide for the metered delivery of colorant from canister 138d through dispensing orifice 144d and into a container such as base paint or stain container 102 or 112 placed on shelf 134. The remaining canisters include similar but unnumbered metered dispensing cylinders, pistons, connecting links, handles and dispensing orifices. Release lever 150 permits turntable 136 to be rotated as needed to bring each colorant canister in line above shelf 134 and locked into place while colorant is metered and dispensed into a base paint or stain container.

Figure 2:
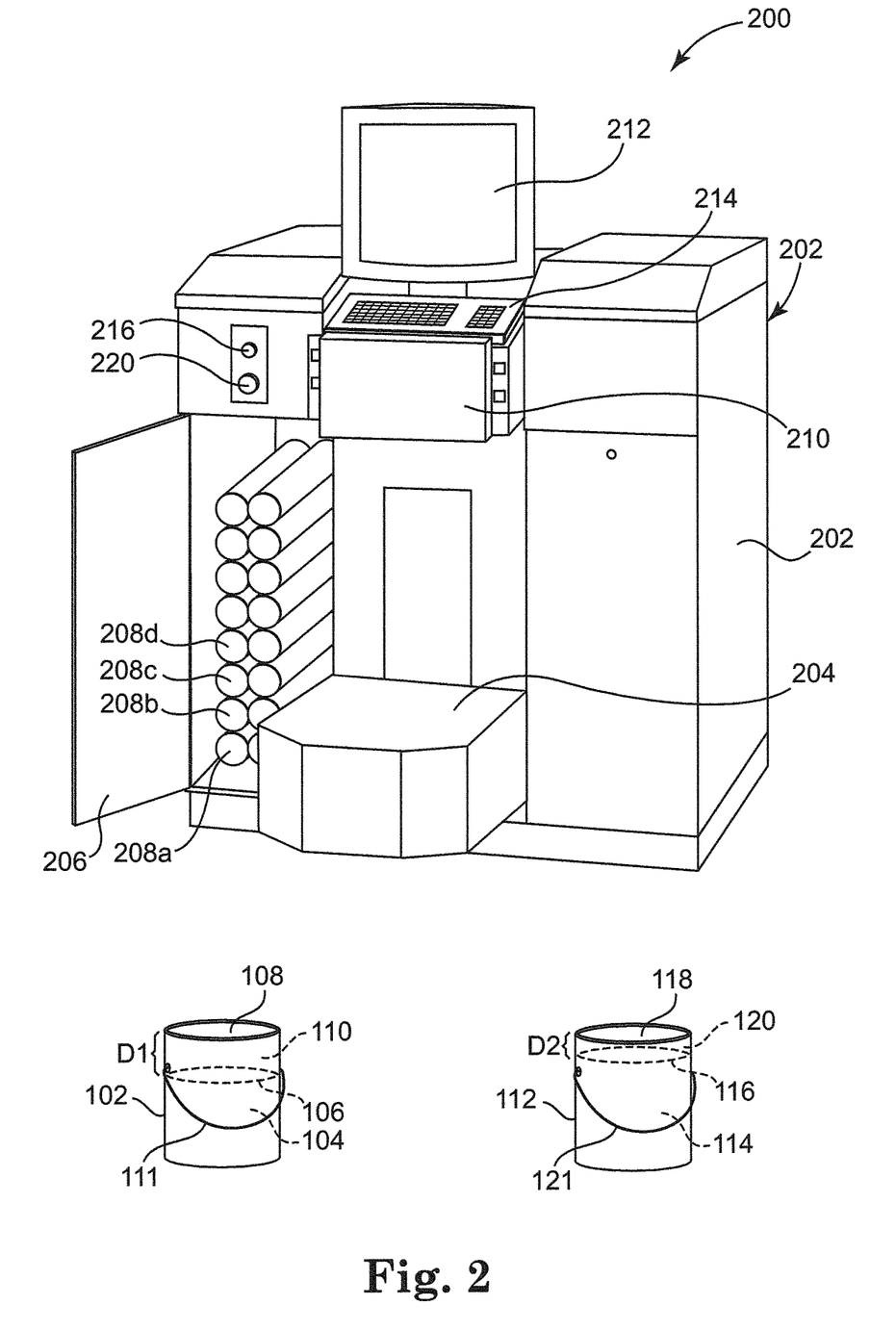

FIG. 2 shows a perspective view of an embodiment 200 of the disclosed paint and stain custom tinting system. Base paint or stain containers 102 and 112 are as in FIG. 1, and may be filled with colorant using automated colorant dispenser 202. Dispenser 202 includes a shelf 204 where containers 102 or 112 may be placed for colorant addition. Cabinet 206 holds a series of replaceable colorant dispenser canisters (sixteen in this case, four of which are numbered as 208a, 208b, 208c and 208d) containing a point-of-sale array of liquid colorants which when dispensed into the paint or stain will provide custom-tinted architectural paints or stains in a variety of tints. Concentrated colorant is dispensed from the canisters, for example by servo-controlled actuation of suitable pistons (not shown in FIG. 2) inside each canister so as to force colorant from the canister through suitable internal plumbing (not shown in FIG. 2) in cabinet 206 and suitable dispensing orifices (not shown in FIG. 2) located in dispensing head 210, and thence into a base paint or stain container. A monitor 212 and keyboard 214 permit information and commands to be entered into dispenser 202. A barcode reader (not shown in FIG. 2) may be used to read information from paint or stain sample cards or base paint or stain containers to assist in controlling the system. A power button 216 and emergency off button 220 may be used to start and stop dispenser 202.

Figure 3:
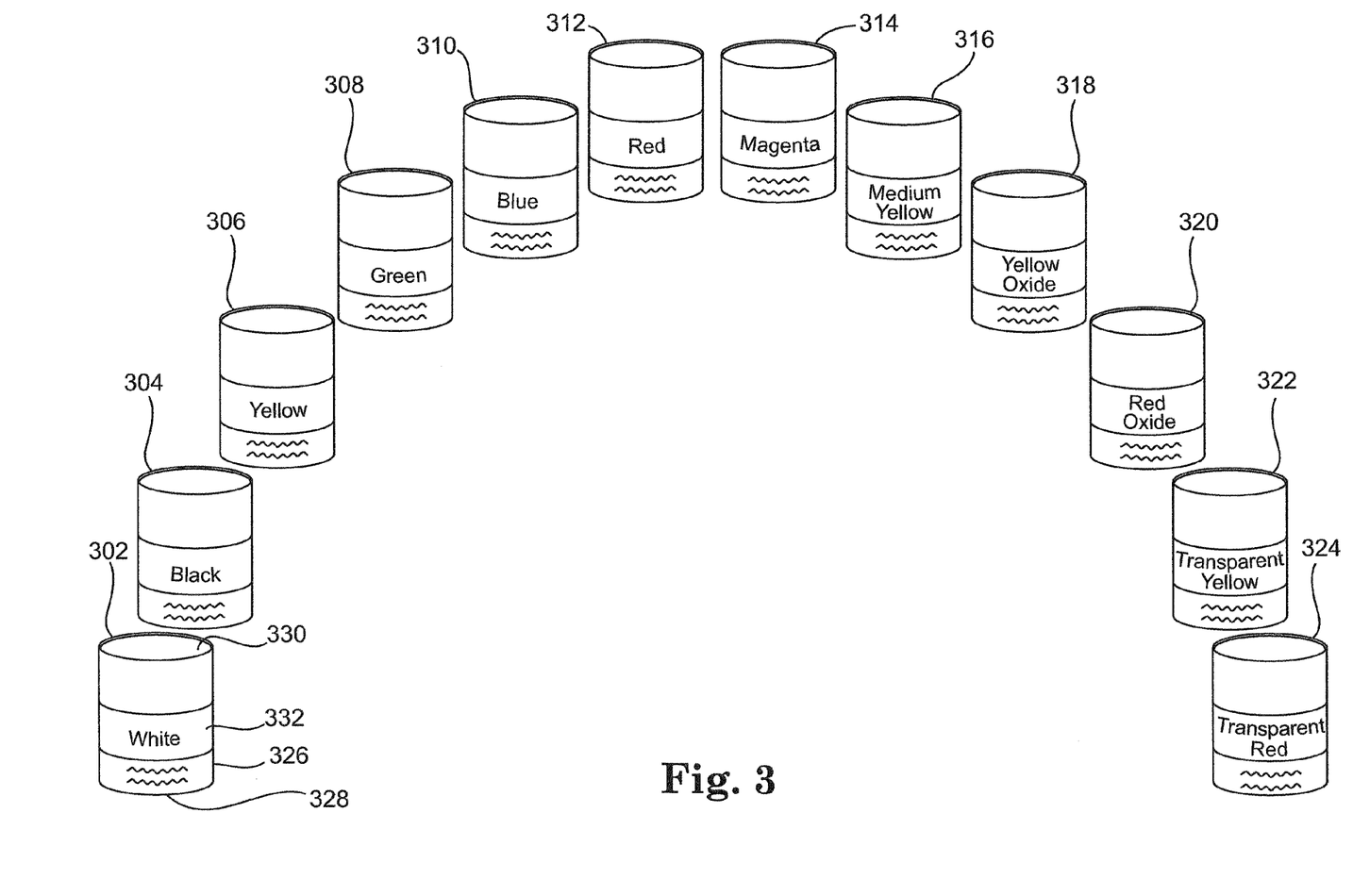
FIG. 3 is a perspective view of an embodiment of the disclosed colorant array.

FIG. 3 is a perspective view of a point-of-sale colorant array 300 with twelve containers 302 through 324. Container 302 includes side 326, bottom 328, top 330 and label 332, and contains a white liquid colorant. The white colorant in container 302 may include one or more and preferably all of polyalkylene glycol humectant, ethoxylated surfactant and extender pigment. Top 330 preferably is puncturable, shearable or otherwise penetrable, and may resemble the top used in soup cans. Containers 304 through 312 respectively contain black-, yellow-hued, green-hued, blue-hued and red-hued colorants. The black colorant in container 304 may include one or more and preferably all of polyalkylene glycol humectant, ethoxylated surfactant and extender pigment. At least one and preferably all of the colorants in containers 308 through 312 include polyalkylene glycol humectant, ethoxylated surfactant and extender pigment. Array 300 includes additional optional containers 314 through 324, which respectively contain magenta-hued, medium yellow-hued, yellow oxide-hued, red oxide-hued, transparent yellow iron oxide-hued and transparent red iron oxide-hued colorants. One or more and in some embodiments most or all of non-primary colorants in containers 306 and 314 through 324 may include one or more of and optionally all of polyalkylene glycol humectant, ethoxylated surfactant and extender pigment. The colorants in containers 302 through 320 will typically be added to paint or stain bases to provide tinted paints and stains, and the colorants in containers 322 and 324 will typically be added to clear stain bases to provide tinted transparent or semi-transparent stains. If desired, fewer, more or other colorants may be employed in the disclosed arrays. For example, the disclosed system and method preferably employs at least 8, 9, 10, 11 or 12 colorants, and may employ as many as 13, 14, 15, 16, 20 or 24 colorants.

A variety of base paints and stains may be used in the disclosed system and method. For example, exemplary base paint sets may comprise, consist essentially of or consist of a set of white and clear (unpigmented) bases, or a set of white, midbase (intermediate white) and clear bases, a set of white, pastel, and clear bases, or a set of white, colored and clear bases. The system may also or instead include one or more stain bases, e.g., transparent, semi-transparent or solid color (viz., opaque) exterior or interior stains. The base paints or stains desirably are low VOC compositions (e.g., aqueous lattices or waterborne dispersions) that will provide finished custom-tinted paints or stains having low VOC characteristics. The base paints or stains may however be VOC-containing compositions (e.g., oil-based paints or stains) if desired. In such case the disclosed colorants desirably are formulated as universal colorants as discussed in more detail below.

The base paints or stains will contain one or more suitable binders and a suitable vehicle or carrier. Exemplary binders may be in a variety of foams including latex polymers and solution polymers, and include but are not limited to acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, drying oil modified polymers such as polyesters and polyurethanes, polyamides, epoxy esters, polyureas, polyurethanes, polysiloxanes, silicones, fluorinated copolymers such as vinylidene fluoride, and blends of any of the above polymeric binders. The base paints, stains or colorants may include a component or components of a multicomponent (e.g., two component) reactive system for the binder such as a component of an isocyanate-polyamine, isocyanate-polyol, epoxy-polyamine, carbodiimide-polyacid, aziridine-polyacid, melamine-polyol, or urea formaldehyde-polyol system. Exemplary base paint or stain carriers include water, organic solvents (e.g., low VOC solvents) and oils. The base paint or stain vehicle may include cosolvents if desired. The binder may for example represent about 5 to about 99 volume percent of the dried coating volume. The volume solids, as defined by the fractional volume of dry ingredients in the as-supplied wet paint or stain, may for example represent about 5 to about 80 volume percent of the base paint or stain. The pigment volume concentration, as defined by the fractional volume of pigment in the dry ingredients, may for example represent 0 to about 95 volume percent of the base paint or stain. The $TiO_2$ volume concentration in a $TiO_2$-containing white base paint, as defined by the fractional volume of $TiO_2$ in the dry paint ingredients, may for example represent 1 to about 30 volume percent of the base paint. The glass transition temperature for a polymeric binder may for example be about −20 to about 60° C. The base paint or stain viscosity may for example be about 60 to about 140 Krebs units.

The base paints or stains typically will be packaged in containers suitable for small batch lots. Exemplary small batch lot container sizes are about one half pint, one pint, one quart, one liter, one gallon, four liter, five gallon or 20 liter containers, corresponding to containers from about 0.24 to 20 L. Depending on the amount of pigmentation (e.g., white pigmentation) already present in a base paint or stain, the container typically will have a small amount of headspace for colorant addition. For example, a one gallon (3.79 L) white base paint container may hold about 128 oz. (3.79 L) of the base paint, with only a small headspace volume available for colorant addition. A one gallon (3.79 L) clear base paint container may for example hold about 116 oz. (3.43 L) of the base paint, with about 12 oz. (0.35 L, or about 9% of the total container volume) of headspace available for colorant addition. When additional base paints of intermediate opacity are employed, they likewise may have intermediate available headspace volumes for colorant addition. For example, a four base system may employ the white and clear base paints mentioned above, together with a pastel base whose container has about 126 oz. (3.73 L) of base paint with about 2 oz. (0.06 L) of headspace available for colorant addition, and a standard color base whose container has about 124 oz. (3.57 L) of base paint with about 4 oz. (0.12 L) of headspace available for colorant addition.

A variety of pigments, dyes and vehicles may be employed in the disclosed colorant arrays. The chosen pigments, if used, desirably can be stably dispersed in the colorant composition so as not to require agitation prior to colorant addition to a base paint or stain. The chosen dyes, if used, desirably are adequately soluble both in the colorant vehicle and the base paint or stain vehicle. Pigments will in general be preferred over dyes for reasons including low cost. Exemplary pigments or dyes include titanium dioxide white, carbon black, lampblack, black iron oxide, red iron oxide, transparent red oxide, yellow iron oxide, transparent yellow oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, organic yellows (such as monoazo yellow), and other substances which will be familiar to persons having ordinary skill in the art of paint and stain tinting Exemplary pigments or dyes also include materials which are non-infrared-absorptive, fluorescent, iridescent; provide a metallic or metalflake appearance; are suitable for use on alkaline surfaces such as stucco; or are materials having enhanced weatherability.

Representative pigments or dyes are available from a number of commercial sources including BASF (Florham Park, N.J.), Ferro Corporation (Cleveland, Ohio) and Shepherd Color Company (Cincinnati, Ohio), Tomatec America, Inc. (Florence, K.Y.). When the available number of colorant dispenser canisters is limited (e.g., when using dispensers holding 12 or fewer canisters), the number of colorant Stock Keeping Units (SKUs) may be reduced as described in International Patent Application No. WO 2009/155296 A1 filed Jun. 16, 2009 and entitled EXPANDED COLOR SPACE ARCHITECTURAL PAINT AND STAIN TINTING SYSTEM. The pigments preferably are substantially free of or completely free of VOCs and do not liberate VOCs when combined with the other ingredients in the colorant composition or in the base paint or stain. Expressed on a volume basis and excluding any extender pigment which may be present, the disclosed liquid colorant compositions may for example contain about 1 to about 40, about 2 to about 40 or about 5 to about 30 volume % pigment or dye. The actual pigment or dye amount in a given colorant generally will vary depending upon factors including the chosen pigment or dye. Also, in order to provide improved hiding power and avoid the need for colored base paints, some colorants (e.g., the blue and green colorants) may include the desired prime or hued pigment as well as a white pigment (e.g., titanium dioxide). Exemplary white pigment amounts in such colorants are about 4 to about 7 wt. % based on the total liquid colorant composition weight.

The colorant vehicle should provide a low VOC liquid colorant composition which preferably is non-settling and substantially or completely free of VOCs. Exemplary colorant vehicles include water and low molecular weight glycols (e.g., ethylene glycol, propylene glycol and glycerine), with water being preferred. The colorant vehicle may include cosolvents if desired. Expressed on a volume basis, the disclosed liquid colorant compositions may for example contain about 40 to about 85 or about 50 to about 75 volume % colorant vehicle.

A variety of polyyalkylene glycol humectants may be employed in the disclosed liquid colorant compositions. Exemplary polyalkylene glycols are soluble or dispersible in the colorant composition and include ethylene glycol, propylene glycol or methoxypolyethylene glycol polyethers of low to medium molecular weight, e.g., having a number average molecular weight of from about 190 to about 800 g/mole, and preferably about 190 to about 400 g/mole. Particularly preferred polyalkylene glycols are liquids as supplied, for example PEG 300 and PEG 400, respectively available from Dow Chemical Co. as CARBOWAX™ PEG 300 and CARBOWAX PEG 400. The humectants preferably are substantially free of or completely free of VOCs and do not liberate VOCs when combined with the other ingredients in the colorant composition or in the base paint or stain. Preferably the majority and more preferably all of the colorants in the array contain polyyalkylene glycol humectants. Expressed on a volume basis, the disclosed liquid colorant compositions preferably contain about 5 to about 25 volume % humectant.

A variety of ethoxylated surfactants may be employed in the disclosed liquid colorant compositions. Exemplary such surfactants are soluble or dispersible in the colorant composition. The ethoxylated surfactants preferably are obtained in liquid form and include secondary alcohol ethoxylates (e.g., various members of the TERGITOL™ 15-S series such as TERGITOL 15-S-5, TERGITOL 15-S-7 and TERGITOL 15-S-9, all available from Dow Chemical Co.), alkyl polyethylene glycol ethers formed from a $C_{10}$-alcohol and ethylene oxide (e.g., the LUTENSOL™ XP series such as LUTENSOL XP 50 and LUTENSOL XP 60, both available from BASF Performance Chemicals), ethylene oxide/propylene oxide block copolymers with primary OH groups (e.g., PLURONIC™ L35, PLURONIC L44, PLURONIC L64 and PLURONIC F68, all available from BASF Performance Chemicals), propylene oxide/ethylene oxide block copolymers with secondary OH groups (e.g., PLURONIC 17R4 and PLURONIC 25R4, both available from BASF Performance Chemicals), ethoxylated tristyrylphenols (e.g., SOPROPHOR™ TS-10, available from Rhodia), tridecyl alcohol ethoxylates (e.g. RHODASURF BC-630 , available from Rhodia), ethoxylated alcohol phosphate ester salts (e.g., RHODAFAC™ LO 529, available from Rhodia), ethoxylated branched alcohol phosphate esters (e.g., RHODAFAC RS-710, available from Rhodia), nonyl phenol ethoxylates (e.g., IGEPAL™ CO-530 and IGEPAL CO-630, both available from Stepan Company), dodecyl phenol ethoxylates (e.g., SURFONIC™ DDP-100, available from Huntsman Corporation), alkylaryl polyglycol ethers (e.g., EMULVIN™ W, available from Bayer AG), PEG 40 hydrogenated Castor oil (e.g., SURFACTOL™ 365 and SURFACTOL 385, both available from Vertellus Specialties Inc.), surfactant blends containing polyethylene oxide groups (e.g., SURFYNOL™ CT-121, available from Air Products and Chemicals, Inc.), alkylaryl polyether alcohol nonionic liquid surfactants (e.g., TRITON™ CF-10, available from Dow Chemical Co.) and other ethoxylated surfactants compatible with waterborne paint colorants. Particularly preferred ethoxylated surfactants include secondary alcohol ethoxylates, alkyl polyethylene glycol ethers formed from a $C_{10}$-alcohol and ethylene oxide, ethylene oxide/propylene oxide block copolymers with primary OH groups, propylene oxide/ethylene oxide block copolymers with secondary OH groups, ethoxylated tristyrylphenols, tridecyl alcohol ethoxylates, ethoxylated branched alcohol phosphate esters, and mixtures thereof. The surfactants preferably are substantially free of or completely free of VOCs and do not liberate VOCs when combined with the other ingredients in the colorant composition or in the base paint or stain. For use with colorants, paints or stains containing hydrophobically modified alkali soluble emulsion (HASE) thickeners, the surfactants preferably are sufficiently compatible with such thickeners so as not to cause objectionable pigment flocculation. Preferably the majority and more preferably all of the colorants in the array contain one or more ethoxylated surfactants. Expressed on a volume basis, the disclosed liquid colorant compositions may for example contain about 0 to about 20 or about 1 to about 20 volume % ethoxylated surfactant.

The disclosed colorants may if desired be formulated as universal colorants miscible both with waterborne and solvent-borne base paints and stains Exemplary universal colorants may be made by adapting the teachings in U.S. Pat. Nos. 6,287,377 B1 and 6,488,760 B1 to Binns et al. and U.S. Patent Application Publication No. US 2006/0207476 A1 to Coward et al. For example, latex-compatible surfactants may be selected from amongst the above-described ethoxylated surfactants, and combined with an alkyd-compatible surfactant as described by Coward et al. to provide a universal surfactant package suitable for use in colorants mixable both with latex and alkyd base paints and stains. Exemplary alkyd-compatible surfactants (some of which are also latex-compatible surfactants) include bis(tridecyl) ester of sodium sulfosuccinic acid (e.g., AEROSOL™ TR-70S, available from Cytec Industries, Inc.), lecithin, lecithin without residual oil (dry lecithin), lecithin with a nonionic surfactant (water dispersible lecithin), various secondary alcohol ethoxylates (e.g., various members of the TERGITOL 15-S series such as TERGITOL 15-S-3 and TERGITOL 15-S-5), various linear alcohol ethoxylates (e.g., SURFONIC L-12-3, available from Huntsman Corporation), alkyl aryl polyether alcohol with a nonionic solubilizer (e.g., TRITON X-207, available from Dow Chemical Co.), various alkyl polyethylene glycol ethers formed from a $C_{10}$-alcohol and ethylene oxide (e.g., LUTENSOL XP 50, available from BASF Performance Chemicals) and mixtures thereof.

The disclosed colorants may contain other surfactants or dispersants if desired. Exemplary such surfactants or dispersants include polyacrylate salts (e.g., NOPCOSPERSE™ 44, available from Henkel AG & Co.), styrene maleic anhydride copolymer salts (e.g., SMA 1440 H, available from Sartomer Company, Inc.) and other substances which will be familiar to persons having ordinary skill in the art of paint and stain tinting.

A variety of extender pigments may be used in the disclosed compositions. Exemplary extender pigments include hydrated alumina, barium sulfate, calcium carbonate, precipitated chalk, kaolin clay, marble dust, pumice, particulate silica and talc, with talc and kaolin clay being preferred extender pigments. Expressed on a volume basis, some of the liquid colorant compositions in the disclosed array may for example contain about 0 to about 20 volume % extender pigment, and other liquid colorant compositions in the disclosed array may for example contain about 1 to about 20 volume % extender pigment. The extender pigment is conveniently combined with the other colorant ingredients by adding the extender in the form of an extender pigment paste containing about 25 to about 50 volume % extender pigment dispersed in water or another carrier and optionally containing one or more suitable surfactants such as the surfactants described above. In some embodiments and especially for primary-hued colorants the volume ratio of extender pigment to polyalkylene glycol humectant desirably is no more than 2.0, less than 2.0, no more than 1.5, less than 1.5 or no more than 1.0. Also, in some embodiments and especially for primary-hued colorants the volume ratio of total pigment (viz., prime pigment plus extender pigment) to polyalkylene glycol humectant desirably is no more than 5.0, no more than 3.5, no more than 3 0, less than 3.0 or no more than 2.5.

The colorants and extender pigment paste may in addition contain a variety of adjuvants including thickeners, defoamers, mildewcides and biocides. The types and amounts of such adjuvants will be familiar to persons having ordinary skill in the art. The chosen adjuvants preferably are substantially free of or completely free of VOCs and do not liberate VOCs when combined with the other ingredients in the colorant composition or the base paint or stain.

Colorant drying characteristics may be evaluated using a sand trail test and a blocking test performed as follows:

Sand Trail Test

The test desirably is carried out so as to compare two colorants having similar hues and differing amounts of ingredients such as polyalkylene glycol humectant, ethoxylated surfactant and extender pigment. Using a wire-wound rod, the two formulations are applied in side-by-side contiguous 0.08 mm (3 mil) thick wet drawdown films along the long dimension of to a sealed rectangular white chart (e.g., a white LENETA™ chart, available from the Leneta Company). The chart is allowed to dry in the open air for 30 minutes in a conditioned room as described in ASTM D 4946-89 (Reapproved 2003), and desirably at 24° C. and 50% R.H. which represent the midpoints for the conditioned room temperature and humidity called for in the ASTM specification. Using a paper cup, a stream of fine sand (e.g., QUICKRETE™ play sand, available from Lowe's) is then sprinkled from a height of about 2.5 cm (1 in) onto the drawdown films so that a sand "stripe" approximately 5 to 10 mm wide is formed across both colorant films. The first strip desirably crosses the films at a region where the films are contiguous to one another, and near the start of the drawdown film paths. Every 30 or 60 minutes, a new sand stripe is dropped onto the drawdown films below (viz., closer to the end of the drawdown film paths) the last sand stripe. This procedure is repeated until past the time at which both drawdown films appear to have dried such that sand may no longer adhere. The time at which each sand stripe was applied is marked in the chart margin alongside the corresponding sand stripe. The sand-striped drawdown films are allowed to air dry overnight. The chart is then held vertically and flicked with a fingernail so that loose sand drops away. The colorant drying time is determined to be the time for the last-applied stripe that does not leave any sand on the drawdown film, and the next-earlier time is determined to be the time for which sprinkled sand will adhere to a 0.08 mm (3 mil) thick wet film of the colorant. Colorants to which sprinkled sand will adhere for at least 24 hours after application of the drawdown stripe appear also to be unlikely to form problematic plugs in colorant dispensing orifices if left undisturbed in a colorant dispenser for at least one full day.

Blocking Test

Using a mixture of 9 vol. % of colorant with a clear waterborne base paint containing a binder having a Tg between about 10 and 20° C., 0.15 mm (6 mil) thick paint films are formed on sealed paper test charts, dried for 7 days in a conditioned room and placed in face-to-face relationship under stoppers and weights in a 48 to 52° C. (115 to 125° F.) and desirably 50° C. (120° F.) oven according to the procedure described in ASTM D 4946-89 (Reapproved 2003). The samples are cooled and evaluated on the ten point scale described in the ASTM specification. The samples should exhibit a blocking resistance rating of 4 or more, and desirably a blocking resistance of at least 5, at least 6, at least 7, at least 8 or at least 9. When reformulating an existing colorant, the reformulated version desirably lowers the observed blocking resistance by no more than one rating point.

VOC levels may be evaluated in a variety of ways, for example using gas chromatography. When evaluating VOCs, the evolution of ammonia or other volatile non-carbon-containing compounds should be excluded.

The invention is further described in the following Examples.

EXAMPLES

An 11 colorant array of low VOC colorants made according to U.S. Patent Application Publication No. US 2006/0207476 A1 to Coward et al. was evaluated using the Sand Trail Test in order to determine the colorant drying times. Set out below in Table 1 are the colorant identifiers, weight percent and volume percent prime pigment, weight percent and volume percent talc extender pigment, and the Sand Trail Test drying time for each colorant in the array:

TABLE 1

| Colorant (Product Code) | Prime Pigment Wt. % | Prime Pigment Vol. % | Talc Wt. % | Talc Vol. % | Sand Trail Time, hours |
|---|---|---|---|---|---|
| White (KX) | 55.5 | 26.5 | 6.5 | 4.0 | >24 |
| Yellow (AXN) | 14.0 | 12.8 | 29.2 | 14.4 | 1 |
| Medium Yellow (T) | 32.7 | 29.0 | 15.9 | 7.3 | <1 |
| Phthalo Green (D) | 11.5 | 7.3 | 28.9 | 14.1 | >7 |
| Phthalo Blue (E) | 6.8 | 6.1 | 39.5 | 20.1 | 1 |
| Red Oxide (F) | 56.9 | 22.7 | 6.3 | 4.8 | >24 |
| Organic Red (S) | 8.0 | 6.8 | 28.6 | 13.4 | 6 |
| Yellow Oxide (C) | 56.9 | 25.2 | 0.0 | 0.0 | >24 |
| Magenta (M) | 55.8 | 24.2 | 0.0 | 0.0 | <2 |
| Raw Umber (L) | 6.5 | 5.6 | 25.2 | 11.4 | <2 |
| Lamp Black (B) | 17.5 | 8.2 | 23.6 | 11.9 | >24 |

The results in Table 1 show that the although the array included four colorants whose Sand Trail Times were at least 24 hours (viz., the white, red oxide, yellow oxide and lamp black colorants), the array also included seven colorants whose Sand Trail Times were significantly less than 24 hours (viz., the yellow, medium yellow, phthalo green, phthalo blue, organic red, magenta and raw umber colorants). These latter colorants can cause problematic dispenser orifice plugging when left in an uncapped colorant dispenser for more than one day. The seven plugging-prone colorants were reformulated as shown below in Tables 2 through 8, by decreasing the amount of PEG 300 humectant, increasing the amount and in some cases changing the type or ethoxylation level of ethoxylated surfactants, by decreasing or eliminating the amount of talc extender filler, and by employing low VOC or VOC-free adjuvants. The Table 1 colorants and reformulated colorants both contained free talc and an extender pigment paste containing talc, humectant, surfactants, water and minor amounts of mildewcide and biocide. The Table 1 extender pigment paste contained 32.9 vol. % talc, 5.96 vol. % PEG 300, 3.27 vol. % LUTENSOL XP-50 and 3.0 vol. % soy lecithin. The reformulated extender pigment paste contained 35.8 vol. % talc, 5.8 vol. % PEG 300, 3.0 vol. % RHODASURF BC-630 and 3.0 vol. % soy lecithin. The resulting colorants all had blocking resistance ratings of 4 or more, reduced theoretical VOC levels and Sand Trail Times of at least 24 hours.

TABLE 2

| Yellow (AXN) Colorant | Table 1 Colorant | Reformulated Colorant |
|---|---|---|
| Humectant, vol. % (PEG 300) | 6.8 | 9.4 |
| Ethoxylated Surfactants, vol. %: | | |
| PLURONIC 17R4 (40 wt. % EO) | 7.8 | 6.4 |
| RHODASURF BC-630 (58.9 wt. % EO) | | 0.6 |
| LUTENSOL XP-50 (58.3 wt. % EO) | 5.0 | |
| SOPROPHOR TS-10 (52.1 wt. % EO) | | 3.9 |
| Other Surfactants, vol. %: | | |
| Soy Lecithin | 0.4 | 0.5 |
| Dry Lecithin | 0.9 | 3.1 |
| SMA 1440 H | 1.1 | 1.0 |
| AEROSOL TR-70S | 1.8 | |
| Prime Pigment, vol. % (PY74) | 12.8 | 13.6 |
| Extender Pigment Paste, vol. % | 13.4 | 18.0 |
| Total Talc, vol. % | 12.9 | 15.0 |

TABLE 2-continued

| Yellow (AXN) Colorant | Table 1 Colorant | Reformulated Colorant |
|---|---|---|
| Total Prime + Extender Pigment, vol. % | 25.8 | 28.6 |
| Ratio, Total Pigment vol. %/Humectant vol. % | 3.8 | 3.0 |
| Ratio, Extender Pigment, vol. %/Humectant, vol. % | 1.9 | 1.6 |
| Blocking Resistance Rating, 120° C. | — | 4 |
| Theoretical VOC, g/L | 24.6 | 1.1 |
| Sand Trail Time, hours | 1 | 24 |

TABLE 3

| Medium Yellow (T) Colorant | Table 1 Colorant | Reformulated Colorant |
|---|---|---|
| Humectant, vol. % (PEG 300) | 6.6 | 7.8 |
| Ethoxylated Surfactants, vol. %: | | |
| PLURONIC 17R4 (40 wt. % EO) | 7.6 | 6.1 |
| RHODASURF BC-630 (58.9 wt. % EO) | | 0.3 |
| LUTENSOL XP-50 (58.3 wt. % EO) | 2 | |
| SOPROPHOR TS-10 (52.1 wt. % EO) | | 3.8 |
| RHODAFAC RS-710 (61.1 wt. % EO) | | 0.9 |
| Other Surfactants, vol. %: | | |
| Soy Lecithin | 0.7 | 0.3 |
| Dry Lecithin | 0.9 | 4.8 |
| SMA 1440 H | 1.2 | 0.9 |
| AEROSOL TR-70S | 1.9 | |
| Prime Pigment, vol. % (PY74 + PY65) | 28.1 | 31.6 |
| Extender Pigment Paste, vol. % | 22.0 | 8.5 |
| Total Talc, vol. % | 7.3 | 3.0 |
| Total Prime + Extender Pigment, vol. % | 35.3 | 34.7 |
| Ratio, Total Pigment vol. %/Humectant vol. % | 5.4 | 4.5 |
| Ratio, Extender Pigment, vol. %/Humectant, vol. % | 1.1 | 0.4 |
| Blocking Resistance Rating, 120° C. | — | 6 |
| Theoretical VOC, g/L | 18.1 | 0.7 |
| Sand Trail Time, hours | <1 | >24 |

TABLE 4

| Phthalo Green (D) Colorant | Table 1 Colorant | Reformulated Colorant |
|---|---|---|
| Humectant, vol. % (PEG 300) | 8.2 | 10.4 |
| Ethoxylated Surfactants, vol. %: | | |
| LUTENSOL XP-50 (58.3 wt. % EO) | 7.3 | |
| PLURONIC 17R4 (40 wt. % EO) | 3.1 | 4.4 |
| RHODASURF BC-630 (58.9 wt. % EO) | | 1.0 |
| RHODAFAC RS-710 (61.1 wt. % EO) | | 2.7 |
| SOPROPHOR TS-10 (52.1 wt. % EO) | | 2.1 |
| Other Surfactants, vol. %: | | |
| Soy Lecithin | 7.3 | 0.9 |
| Dry Lecithin | | 3.6 |
| Prime Pigment, vol. % (PG7) | 7.4 | 6.5 |
| Extender Pigment Paste, vol. % | 26.8 | 29.9 |
| Total Talc, vol. % | 13.8 | 14.9 |
| Total Prime + Extender Pigment, vol. % | 21.2 | 21.4 |
| Ratio, Total Pigment vol. %/Humectant vol. % | 2.6 | 2.1 |

TABLE 4-continued

| Phthalo Green (D) Colorant | Table 1 Colorant | Reformulated Colorant |
|---|---|---|
| Ratio, Extender Pigment, vol. %/Humectant, vol. % | 1.7 | 1.4 |
| Blocking Resistance Rating, 120° C. | — | 7 |
| Theoretical VOC, g/L | 20.6 | 0.1 |
| Sand Trail Time, hours | >7 | 24 |

TABLE 5

| Phthalo Blue (E) Colorant | Table 1 Colorant | Reformulated Colorant |
|---|---|---|
| Humectant, vol. % (PEG 300) | 8.7 | 11.5 |
| Ethoxylated Surfactants, vol. %: | | |
| LUTENSOL XP-50 (58.3 wt. % EO) | 5.1 | |
| PLURONIC 17R4 (40 wt. % EO) | 3.9 | 4.5 |
| RHODASURF BC-630 (58.9 wt. % EO) | | 5.5 |
| RHODAFAC RS-710 (61.1 wt. % EO) | | 1.8 |
| Other Surfactants, vol. %: | | |
| Soy Lecithin | 3.6 | 4.5 |
| Prime Pigment, vol. % (PB 15:2) | 6.1 | 6.1 |
| Extender Pigment Paste, vol. % | 31.1 | 18.8 |
| Total Talc, vol. % | 19.7 | 11.4 |
| Total Prime + Extender Pigment, vol. % | 25.8 | 17.6 |
| Ratio, Total Pigment vol. %/Humectant vol. % | 3.0 | 1.5 |
| Ratio, Extender Pigment, vol. %/Humectant, vol. % | 2.3 | 1.0 |
| Blocking Resistance Rating, 120° C. | — | 6 |
| Theoretical VOC, g/L | 20.3 | 0.3 |
| Sand Trail Time, hours | 1 | 24 |

TABLE 6

| Organic Red (S) Colorant | Table 1 Colorant | Reformulated Colorant |
|---|---|---|
| Humectant, vol. % (PEG 300) | 8.3 | 7.9 |
| Ethoxylated Surfactants, vol. %: | | |
| PLURONIC 17R4 (40 wt. % EO) | 2.7 | 2.7 |
| RHODASURF BC-630 (58.9 wt. % EO) | | 0.6 |
| LUTENSOL XP-50 (58.3 wt. % EO) | 3.7 | |
| SOPROPHOR TS-10 (52.1 wt. % EO) | | 2.6 |
| Other Surfactants, vol. %: | | |
| Soy Lecithin | 9.5 | 9.3 |
| Prime Pigment, vol. % (PR209 + PR112) | 7.3 | 7.3 |
| Extender Pigment Paste, vol. % | 26.2 | 19.1 |
| Total Talc, vol. % | 11.4 | 8.6 |
| Total Prime + Extender Pigment, vol. % | 18.6 | 15.9 |
| Ratio, Total Pigment vol. %/Humectant vol. % | 2.2 | 2.0 |
| Ratio, Extender Pigment, vol. %/Humectant, vol. % | 1.4 | 1.1 |
| Blocking Resistance Rating, 120° C. | — | 6 |
| Theoretical VOC, g/L | 16.7 | 1.1 |
| Sand Trail Time, hours | 6 | >24 |

TABLE 7

| Magenta (M) Colorant | Table 1 Colorant | Reformulated Colorant |
|---|---|---|
| Humectant, vol. % (PEG 300) | 6.6 | 12.2 |
| Ethoxylated Surfactants, vol. %: | | |
| LUTENSOL XP-50 (58.3 wt. % EO) | 2.1 | |
| PLURONIC 17R4 (40 wt. % EO) | 1.8 | 1.9 |

TABLE 7-continued

| Magenta (M) Colorant | Table 1 Colorant | Reformulated Colorant |
|---|---|---|
| RHODASURF BC-630 (58.9 wt. % EO) | | 0.4 |
| SOPROPHOR TS-10 (52.1 wt. % EO) | | 2.9 |
| RHODAFAC RS-710 (61.1 wt. % EO) | | 2.6 |
| Other Surfactants, vol. %: | | |
| Soy Lecithin | 8.6 | 7.8 |
| Prime Pigment, vol. % (PR122) | 5.6 | 5.8 |
| Extender Pigment Paste, vol. % | 7.3 | 12.1 |
| Total Talc, vol. % | 11.1 | 13.9 |
| Total Prime + Extender Pigment, vol. % | 16.7 | 19.7 |
| Ratio, Total Pigment vol. %/Humectant vol. % | 2.5 | 1.6 |
| Ratio, Extender Pigment, vol. %/Humectant, vol. % | 1.7 | 1.1 |
| Blocking Resistance Rating, 120° C. | — | 6 |
| Theoretical VOC, g/L | 16.5 | 0.2 |
| Sand Trail Time, hours | <2 | >24 |

TABLE 8

| Raw Umber (L) Colorant | Table 1 Colorant | Reformulated Colorant |
|---|---|---|
| Humectant, vol. % (PEG 300) | 10.9 | 13.3 |
| Ethoxylated Surfactants, vol. %: | | |
| LUTENSOL XP-50 (58.3 wt. % EO) | 0.4 | |
| PLURONIC L-35 (50 wt. % EO) | 5.9 | 5.9 |
| RHODASURF BC-630 (58.9 wt. % EO) | | 6.1 |
| RHODAFAC RS-710 (61.1 wt. % EO) | | 1.4 |
| Other Surfactants, vol. %: | | |
| Soy Lecithin | 0.3 | 5.6 |
| Dry Lecithin | 10.8 | |
| TAMOL ™ 731 (25% solids) | 1.9 | 2.2 |
| Prime Pigment, vol. % (PBR7) | 7.9 | 8.1 |
| Extender Pigment Paste, vol. % | 10.9 | 8.5 |
| Total Talc, vol. % | 11.1 | 11.6 |
| Total Prime + Extender Pigment, vol. % | 19.0 | 19.6 |
| Ratio, Total Pigment vol. %/Humectant vol. % | 1.8 | 1.5 |
| Ratio, Extender Pigment, vol. %/Humectant, vol. % | 1.0 | 0.9 |
| Blocking Resistance Rating, 120° C. | — | 5 |
| Theoretical VOC, g/L | 4.2 | 0.1 |
| Sand Trail Time, hours | <2 | 24 (v. slight) |

The results in Tables 2 through 8 show acceptable or better blocking and substantial improvement in VOC levels and Sand Trail Times for each of the reformulated colorants. The reformulated colorants could be used to form a plugging-resistant colorant array that could be left undisturbed for a full day in a colorant dispensing machine without requiring the use of orifice caps or other measures to discourage problematic orifice plugging.

The remaining four colorants in Table 1 were similarly reformulated to reduce their VOC levels while retaining blocking resistance and resistance to problematic orifice plugging. The results are shown below in Tables 9 though 12:

TABLE 9

| White (KX) Colorant | Table 1 Colorant | Reformulated Colorant |
|---|---|---|
| Humectant, vol. % (PEG 300) | 16.3 | 15.8 |
| Ethoxylated Surfactants, vol. %: | | |
| TERGITOL 15-S-9 (63.3 wt. % EO) | 7.3 | 6.8 |
| LUTENSOL XP-50 (58.3 wt. % EO) | 0.6 | |
| RHODASURF BC-630 (58.9 wt. % EO) | | 0.7 |
| Other Surfactants, vol. %: | | |
| Soy Lecithin | 0.6 | 4.3 |
| Dry Lecithin | 2.7 | |
| TAMOL™ 731 (25% solids) | 1.4 | 1.4 |
| Prime Pigment, vol. % (PW6) | 27.0 | 26.3 |
| Extender Pigment Paste, vol. % | 19.4 | 22.6 |
| Total Talc, vol. % | 6.4 | 8.1 |
| Total Prime + Extender Pigment, vol. % | 33.4 | 34.4 |
| Ratio, Total Pigment vol. %/Humectant vol. % | 2.0 | 2.2 |
| Ratio, Extender Pigment, vol. %/Humectant, vol. % | 0.4 | 0.5 |
| Blocking Resistance Rating, 120° C. | — | 7 |
| Theoretical VOC, g/L | 4.4 | 0.0 |
| Sand Trail Time, hours | >24 | >24 |

TABLE 10

| Red Oxide (F) Colorant | Table 1 Colorant | Reformulated Colorant |
|---|---|---|
| Humectant, vol. % (PEG 300) | 21.0 | 12.8 |
| Ethoxylated Surfactants, vol. %: | | |
| PLURONIC L-35 (50 wt. % EO) | 4.2 | |
| LUTENSOL XP-50 (58.3 wt. % EO) | 0.6 | |
| TERGITOL 15-S-9 (63.3 wt. % EO) | | 11.7 |
| RHODAFAC RS-710 (61.1 wt. % EO) | | 2.9 |
| Other Surfactants, vol. %: | | |
| Soy Lecithin | 0.5 | |
| Dry Lecithin | 1.4 | |
| TAMOL 731 (25% solids) | 0.9 | |
| SMA 1440 H | | 2.9 |
| ATLAS G-3300 | | 1.8 |
| Prime Pigment, vol. % (PR101) | 23.0 | 20.6 |
| Extender Pigment Paste, vol. % | 17.9 | 0.0 |
| Total Talc, vol. % | 5.9 | 0.0 |
| Total Prime + Extender Pigment, vol. % | 28.9 | 20.6 |
| Ratio, Total Pigment vol. %/Humectant vol. % | 1.4 | 1.6 |
| Ratio, Extender Pigment, vol. %/Humectant, vol. % | 0.3 | 0.0 |
| Blocking Resistance Rating, 120° C. | — | 6 |
| Theoretical VOC, g/L | 4.4 | 0.0 |
| Sand Trail Time, hours | >24 | >24 |

TABLE 11

| Yellow Oxide (C) Colorant | Table 1 Colorant | Reformulated Colorant |
|---|---|---|
| Humectant, vol. % (PEG 300) | 21.2 | 21.9 |
| Ethoxylated Surfactants, vol. %: | | |
| TERGITOL 15-S-9 (63.3 wt. % EO) | 7.7 | 7.8 |
| Other Surfactants, vol. %: | | |
| Dry Lecithin | 3.2 | 3.3 |
| TAMOL™ 731 (25% solids) | 2.3 | 2.5 |
| Prime Pigment, vol. % (PY42) | 24.2 | 24.9 |
| Extender Pigment Paste, vol. % | 0.0 | 0.0 |
| Total Talc, vol. % | 0.0 | 0.0 |
| Total Prime + Extender Pigment, vol. % | 24.2 | 24.9 |
| Ratio, Total Pigment vol. %/Humectant vol. % | 1.1 | 1.1 |
| Ratio, Extender Pigment, vol. %/Humectant, vol. % | 0.0 | 0.0 |
| Blocking Resistance Rating, 120° C. | — | 7 |
| Theoretical VOC, g/L | 10.2 | 0.0 |
| Sand Trail Time, hours | >24 | >24 |

TABLE 12

| Lamp Black (B) Colorant | Table 1 Colorant | Reformulated Colorant |
|---|---|---|
| Humectant, vol. % (PEG 300) | 7.0 | 8.0 |
| Ethoxylated Surfactants, vol. %: | | |
| LUTENSOL XP-50 (58.3 wt. % EO) | 6.7 | |
| PLURONIC 17R4 (40 wt. % EO) | 6.0 | |
| TERGITOL 15-S-5 (49.3 wt. % EO) | 3.1 | |
| TERGITOL 15-S-7 (57.6 wt. % EO) | | 12.3 |
| RHODAFAC RS-710 (61.1 wt. % EO) | | 0.9 |
| RHODASURF BC-630 (58.9 wt. % EO) | | 0.9 |
| Other Surfactants, vol. %: | | |
| Soy Lecithin | 3.1 | 4.9 |
| Dry Lecithin | 1.9 | |
| ATLAS G-3300 | | 1.9 |
| Prime Pigment, vol. % (PBK7) | 7.0 | 7.1 |
| Extender Pigment Paste, vol. % | 12.7 | 26.9 |
| Total Talc, vol. % | 6.4 | 11.9 |
| Total Prime + Extender Pigment, vol. % | 13.4 | 19.0 |
| Ratio, Total Pigment vol. %/Humectant vol. % | 1.9 | 2.4 |
| Ratio, Extender Pigment, vol. %/Humectant, vol. % | 0.9 | 1.5 |
| Blocking Resistance Rating, 120° C. | — | 5 |
| Theoretical VOC, g/L | 23.5 | 0.2 |
| Sand Trail Time, hours | >24 | >24 |

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A point-of-sale system for making custom-tinted waterborne architectural paints and stains, the system comprising an array of low volatile organic compound concentrated liquid colorants comprising pigment or dye and a vehicle, the array including at least white colorant; black colorant; and green-hued, blue-hued and red-hued primary colorants at least one of which primary colorants comprises polyalkylene glycol humectant, ethoxylated surfactant and extender pigment; wherein colorants in the array containing polyalkylene glycol humectant include amounts of such polyalkylene glycol humectant, any ethoxylated surfactant and any extender pigment such that sprinkled sand will adhere to 0.08 mm (3 mil) wet coating thickness films of each of the colorants in the array after air drying such films for at least 24 hours in a conditioned room as described in ASTM D 4946-89 (Reapproved 2003), and wherein the amounts of polyalkylene glycol humectant in such polyalkylene glycol humectant-containing colorants are such that individual dried paint films made by mixing 9 vol. % of such polyalkylene glycol humectant-containing colorants with a clear waterborne base paint containing a binder having a Tg between about 10 and 20° C. will exhibit a blocking resistance rating of 4 or more when evaluated using ASTM D 4946-89 (Reapproved 2003).

2. A system according to claim 1 wherein each of the colorant compositions in the array contains less than about 5 wt. % volatile organic compounds.

3. A system according to claim 1 wherein each of the primary colorants in the array comprises polyalkylene glycol humectant, ethoxylated surfactant and extender pigment.

4. A system according to claim 1 wherein the polyalkylene glycol humectant comprises liquid linear ethylene glycol polyethers having a number average molecular weight of from about 190 to about 800 g/mole.

5. A system according to claim 1 wherein the polyalkylene glycol humectant comprises PEG 300 or PEG 400.

6. A system according to claim 1 wherein the ethoxylated surfactant comprises nonyl phenol ethoxylate, dodecyl phenol ethoxylate, alkylaryl polyglycol ether, PEG 40 hydrogenated Castor oil, surfactant blend containing polyethylene oxide groups, alkylaryl polyether alcohol nonionic liquid surfactant or mixture thereof.

7. A system according to claim 1 wherein the ethoxylated surfactant comprises secondary alcohol ethoxylate, alkyl polyethylene glycol ether formed from a $C_{10}$-alcohol and ethylene oxide, ethylene oxide/propylene oxide block copolymer with primary OH groups, propylene oxide/ethylene oxide block copolymer with secondary OH groups, ethoxylated tristyrylphenol, tridecyl alcohol ethoxylate, ethoxylated branched alcohol phosphate ester, or mixture thereof.

8. A system according to claim 1 wherein the ethoxylated surfactants in the array are substantially free of volatile organic compounds.

9. A system according to claim 1 wherein the ethoxylated surfactants in the array are sufficiently compatible with hydrophobically modified alkali soluble emulsion (HASE) thickeners so as not to cause pigment flocculation in colorants, paints or stains containing such thickeners.

10. A system according to claim 1 wherein the extender pigment comprises hydrated alumina, barium sulfate, calcium carbonate, precipitated chalk, marble dust, pumice, particulate silica or mixture thereof.

11. A system according to claim 1 wherein the extender pigment comprises kaolin clay or talc.

12. A system according to claim 1 wherein the liquid colorant compositions contain about 5 to about 25 volume % humectant and about 1 to about 20 volume % ethoxylated surfactant, and wherein some of the liquid colorant compositions in the array contain about 0 to about 20 volume % extender pigment and other liquid colorant compositions in the array contain about 1 to about 20 volume % extender pigment.

13. A system according to claim 1 wherein for all primary colorants in the array the volume ratio of extender pigment to polyalkylene glycol humectant is no more than 2.0.

14. A system according to claim 1 wherein for all primary colorants in the array the volume ratio of total prime pigment plus extender pigment to polyalkylene glycol humectant is less than 3.0.

15. A system according to claim 1 wherein for all colorants in the array the volume ratio of extender pigment to polyalkylene glycol humectant is less than 2.0 and the volume ratio of total prime pigment plus extender pigment to polyalkylene glycol humectant is less than 5.0.

16. A point-of-sale method for making custom-tinted architectural paints or stains, the method comprising:
a) dispensing colorant into waterborne base paint or stain from a colorant dispenser having a plurality of colorant dispensing orifices each of which is in fluid communication with a colorant of an array of low volatile organic compound concentrated liquid colorants comprising pigment or dye and a vehicle, the array including at least white colorant; black colorant; and green-hued, blue-hued and red-hued primary colorants at least one of which primary colorants comprises polyalkylene glycol humectant, ethoxylated surfactant and extender pigment; wherein colorants in the array containing polyalkylene glycol humectant include amounts of such polyalkylene glycol humectant, any ethoxylated surfactant and any extender pigment such that sprinkled sand will adhere to 0.08 mm (3 mil) wet coating thickness films of each of the colorants in the array after air drying such films for at least 24 hours in a conditioned room as described in ASTM D 4946-89 (Reapproved 2003), and wherein the amounts of polyalkylene glycol humectant in such polyalkylene glycol humectant-containing colorants are such that individual dried paint films made by mixing 9 vol. % of such polyalkylene glycol humectant-containing colorants with a clear waterborne base paint containing a binder having a Tg between about 10 and 20° C. will exhibit a blocking resistance rating of 4 or more when evaluated using ASTM D 4946-89 (Reapproved 2003);
b) allowing the dispenser to remain idle with its orifices exposed to air for at least 24 hours and without forming orifice plugs; and
c) dispensing colorant into additional base paint or stain from the colorant dispenser.

17. A method according to claim 16 wherein the base paint or stain comprises a waterborne latex.

18. A method according to claim 16 wherein the base paint or stain is in a container having an interior volume of about 0.2 to 20 L.

19. A method according to claim 16 comprising dispensing colorant into a set of base paints including white, midbase and clear bases.

20. A method according to claim 16 comprising dispensing colorant into a set of base stains including transparent, semi-transparent and solid color exterior or interior stains.

21. A method according to claim 16 wherein the colorants are universal colorants miscible with both waterborne and solvent-borne base paints and stains.

22. A method according to claim 16 wherein the ethoxylated surfactants in the array are compatible with hydrophobically modified alkali soluble emulsion (HASE) thickeners so as not to cause pigment flocculation in colorants, paints or stains containing such thickeners.

23. A method according to claim 16 wherein each of the primary colorants in the array comprises polyalkylene glycol humectant, ethoxylated surfactant and extender pigment.

24. A method according to claim 16 wherein the liquid colorant compositions contain about 5 to about 25 volume % polyalkylene glycol humectant comprising a linear ethylene glycol polyether having a number average molecular weight of from about 190 to about 800 g/mole and about 1 to about 20 volume % ethoxylated surfactant; wherein some of the liquid colorant compositions in the array contain about 0 to about 20 volume % extender pigment and other liquid colorant compositions in the array contain about 1 to about 20 volume % extender pigment; and wherein the extender pigment comprises hydrated alumina, barium sulfate, calcium carbonate, precipitated chalk, kaolin clay, marble dust, pumice, particulate silica, talc or mixture thereof.

25. A method according to claim 16 wherein for all primary colorants in the array the volume ratio of extender pigment to polyalkylene glycol humectant is less than 2.0 and the volume ratio of total prime pigment plus extender pigment to polyalkylene glycol humectant is less than 5.0.

* * * * *